United States Patent [19]

Ejk et al.

[11] 4,010,138
[45] Mar. 1, 1977

[54] METHOD FOR IMPROVING THE HEAT STABILITY OF POLYVINYL CHLORIDE

[75] Inventors: Adam J. Ejk, Piscataway; Robert C. Ringwood, Jr., Sewaren, both of N.J.

[73] Assignee: M & T Chemicals Inc., Greenwich, Conn.

[22] Filed: Dec. 6, 1974

[21] Appl. No.: 530,357

Related U.S. Application Data

[62] Division of Ser. No. 454,364, March 25, 1974, abandoned.

[52] U.S. Cl. .................. 260/45.75 S; 260/30.6 R; 260/45.75 T
[51] Int. Cl.² ......................................... C08K 5/52
[58] Field of Search ............... 260/45.7 P, 45.75 S, 260/45.75 T

[56] References Cited

UNITED STATES PATENTS

| | | | |
|---|---|---|---|
| 3,476,699 | 11/1969 | Kauder | 260/45.75 T |
| 3,483,159 | 12/1969 | Kauder | 260/45.7 PH |
| 3,539,636 | 11/1970 | Dorfelt | 260/45.7 PH |
| 3,632,538 | 1/1972 | Kauder | 260/45.7 PH |
| 3,647,748 | 3/1972 | Brook | 260/45.75 T |
| 3,666,700 | 5/1972 | King | 260/45.7 PH |
| 3,697,463 | 10/1972 | Oakes | 260/45.75 T |

*Primary Examiner*—Paul R. Michl
*Attorney, Agent, or Firm*—Robert P. Auber; Kenneth G. Wheeless; Robert Spector

[57] ABSTRACT

The heat stability imparted to plasticized vinyl chloride polymers by di- or triesters of phosphorous acid is significantly increased by the addition of 0.1–1% by weight of specified organotin compounds to the polymer composition. The concentration of organotin compound is between 3 and 45%, based on the combined weight of the phosphorous acid ester and organotin compound.

6 Claims, No Drawings

METHOD FOR IMPROVING THE HEAT STABILITY OF POLYVINYL CHLORIDE

This is a divisional of application Ser. No. 454,364, filed 3/25/74 now abandoned.

BACKGROUND

This invention relates to plastisols containing vinyl chloride polymers which are stabilized against heat-induced discoloration and degradation.

This invention further relates to a method for enhancing the heat stability imparted to plasticized vinyl chloride polymer compositions by organic esters of phosphorous acid.

It is well known that triorganophosphites of the general formula $P(OR)_3$ wherein each R is an alkyl or aryl radical impart useful levels of heat stability to vinyl chloride polymers. U.S. Pat. No. 2,867,594 to Floyd R. Hansen et al. discloses that mixed alkyl-aryl phosphites are particularly suitable for this purpose. The patent further teaches that mixtures containing the phosphites and an organic acid salt of an alkali metal or alkaline earth metal can be employed in combination with other known stabilizers, including organic salts of cadmium, zinc or tin.

Using combinations of organophosphites or other auxiliary stabilizers with specified reaction products of stannoic acids to improve the heat stabilization imparted to vinyl chloride polymers is disclosed in U.S. Pat. No. 3,413,284. A number of patents, including British Pat. No. 1,180,398 teach the desirability of adding organophosphites to organotin mercaptides or organotin mercaptoacid esters to increase the heat stability of vinyl chloride polymers. The resultant mixture of polymer and stabilizers together with other additives including plasticizers, impact modifiers, lubricants and pigments is blended to form a homogeneous composition. In many instances the blending is accomplished using a roller mill or extruder. This is true for the polymer samples disclosed in Canadian Pat. No. 910,538, which teaches that certain organophosphites enhance the heat stabilization imparted to vinyl chloride polymers by monoorganotin derivatives of mercaptoacid esters. Experimental data contained in the aforementioned Canadian patent demonstrate that the beneficial effect of the phosphite is limited to monoorganotin compounds. Polymer compositions containing the corresponding diorganotin compounds such as dibutyltin-S,S'-bis(isooctyl mercaptoacetate) exhibit a decrease rather than an increase in heat stability when a phosphite is added.

Surprisingly it has now been found that if a plasticized vinyl chloride polymer composition containing a phosphite as the primary stabilizer is not subjected to a significant amount of shear while in the molten state, the addition of between 0.1 and 1%, based on the weight of the composition, of certain organotin compounds significantly increases resistance to discoloration at temperatures of 150° C. and higher. The concentration of organotin compound is between 3 and 45%, based on the combined weight of phosphite and organotin compound.

SUMMARY OF THE INVENTION

This invention provides an improved plasticized vinyl chloride polymer composition consisting essentially of 1. a vinyl chloride homopolymer or a copolymer wherein at least 50% of the repeating units are derived from vinyl chloride, the remaining repeating units being derived from one or more ethylenically unsaturated compounds which are copolymerizable with vinyl chloride;

2. between 5 and 60%, based on the weight of said composition, of a plasticizer selected from the group consisting of esters of carboxylic acids wherein the acid and alcohol residues of the carboxylic acid esters contain between 2 and 20 carbon atoms, trialkyl, triaryl and mixed aryl-alkyl triesters of phosphoric acid, esters derived from benzoic acid and oligomers of alkylene diols containing from 2 to 5 repeating units, epoxidized esters of unsaturated fatty acids, esters of trimellitic acid, chlorinated paraffinic hydrocarbons and liquid polyesters derived from aliphatic dicarboxylic acids and diols;

3. between 0.5 and 5%, based on the weight of said composition, of an organic ester of phosphorus acid, said ester exhibiting the general formula $P(OR^1)_3$ or $P(OR^1)_2(OR^2)$ wherein $R^1$ and $R^2$ are each selected from the group consisting of alkyl radicals containing between 1 and 20 carbon atoms, cycloalkyl, aralkyl, aryl, alkaryl radicals and hydrogen atoms, with the proviso that the number of hydrogen atoms is 0 or 1. The improvement resides in the presence of between 0.1 and 1%, based on the weight of said composition, of an organotin compound corresponding to the general formula

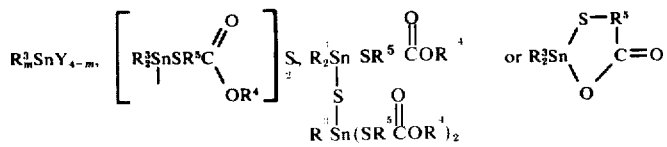

wherein $m$ represents the integer 1, 2 or 3 and Y represents a radical exhibiting a formula selected from the group consisting

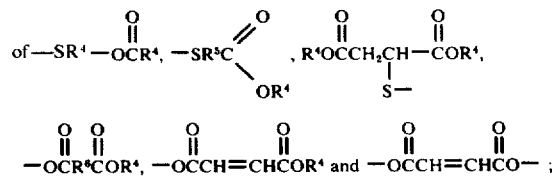

$R^3$ and $R^4$ are each individually selected from the group consisting of alkyl radicals containing between 1 and 20 carbon atoms, cycloalkyl, aralkyl, aryl and alkaryl radicals, $R^5$ is a methylene or ethylene radical, and $R^6$ is an alkylene radical containing between 1 and 8 carbon atoms, inclusive with the proviso that the organotin compound constitutes between 3 and 45% of the combined weight of the organotin compound and the organic ester of phosphorous acid.

DETAILED DESCRIPTION OF THE INVENTION

The stabilizer compositions of this invention enhance the resistance to heat-induced degradation of plasticized vinyl chloride polymers which are not subjected to the high levels of shear encountered when the polymers are processed using calender rolls or are forced under high pressure through the relatively small orifices present in conventional extruders and injection molding machines.

The phosphites, or esters of phosphorous acid, which are preferred for use in the present stabilizer compositions exhibit the general formula $(R^1O)_3P$ or $(R^1O)_2(R^2O)P$ wherein $R^1$ and $R^2$ are individually selected from among alkyl radicals containing between 1 and 20 carbon atoms, unsubstituted phenyl radicals and phenyl radicals bearing one or two alkyl radicals as substituents wherein the alkyl radicals each contain between 1 and 20 carbon atoms, inclusive. Either $R^1$, $R^2$ or both may contain a hydroxyl or alkoxy group as a substituent.

Suitable phosphites include:
Triphenyl phosphite
Diphenyl isodecyl phosphite
Bis(p-nonylphenyl) phenyl phosphite
Phenyl diisodecyl phosphite
(p-methoxyphenyl) diisodecyl phosphite
p-hydroxyphenyl diisodecyl phosphite
p-nonylphenyl bis(hydrogenated bis phenol A) phosphite
Tetrakis(p-nonylphenyl) polypropylene glycol (PPG) 425 diphosphite
Bis(p-nonylphenyl) PPG 425 phosphite
1-naphthyl diisodecyl phosphite
2-naphthyl diisodecyl phosphite
p-cyclohexylphenyl diisodecyl phosphite
Bis(isooctyl) p-nonylphenyl phosphite Triphenyl phosphite, diphenyl isodecyl phosphite, triisodecyl phosphite and diisodecyl phenyl phosphite are particularly preferred for use in the present stabilizer compositions.

The phosphite is the major stabilizing component of the present compositions and constitutes between 0.2 and 5%, based on the weight of said composition. The degree of heat stabilization is considerably enhanced when the phosphite is combined with certain mono-, di- and triorganotin compounds in such low concentrations as are usually considered ineffective in that they do not impart significant heat stability in the absence of the phosphite. Between 0.1 and 1% of the organotin compound, based on the weight of the polymer composition, is useful. Little if any beneficial effect results from employing more than about 1% of the organotin compound. Concentrations of between 0.1 and 0.5% are preferred. The organotin compound extends the period of time during which the polymer composition can be exposed to elevated temperatures without discoloring to the extent that the composition is no longer commercially useful.

Organotin compounds that are suitable for use with phosphite to form the present stabilizer compositions exhibit the general formula $R_m{}^3SnY_{4-m}$,

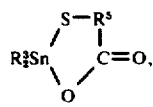

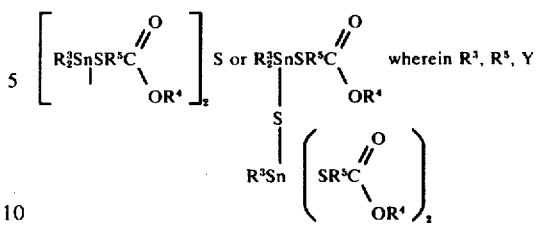

wherein $R^3$, $R^5$, Y and $m$ have been defined in the preceding section of this specification. One class of suitable compounds can be broadly defined as mono-, di- and triorganotin derivatives of mercaptans, mercaptoacids and mercaptoacid esters, the organotin compound having been formed by replacement of a hydrogen-sulfur or hydrogen-oxygen bond with a tin-sulfur or tin-oxygen bond. A second class of suitable organotin compounds includes mono-, di- and triorganotin carboxylates wherein the acid residue is derived from monocarboxylic acids containing between 2 and 20 carbon atoms. Alternatively the acid portion of the molecule can be the residue of a dicarboxylic acid such as maleic, fumaric or adipic acid or a half ester of a dicarboxylic acid. Residues derived from half esters of maleic acid, i.e.

$$-\overset{O}{\underset{\|}{O}}CCH=CHC\overset{O}{\underset{\|}{O}}C_8H_{17}$$

are particularly preferred.

The following radicals are among those which can be represented by $R^3$ and Y in the foregoing formula $R_m{}^3SnY_{4-m}$.

$R^3$
1. alkyl radicals — methyl, ethyl, n-propyl, isopropyl, the isomeric butyl, hexyl, 2-ethyl hexyl, octyl, decyl, dodecyl and eicosanyl radicals;
2. aryl radicals — phenyl, naphthyl;
3. cycloalkyl radicals — cyclopentyl, cyclohexyl, cyclooctyl;
4. aralkyl radicals — benzyl, β-phenylethyl;
5. alkaryl radicals — tolyl, o-, m- or p- xylyl.

Y
1. a mercaptan residue $-SR^4$ wherein $R^4$ is selected from the same group as $R^3$;
2. a mercaptoacid ester residue

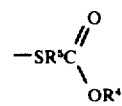

or a mercaptoacid residue

wherein $R^4$ is as defined hereinabove and $R^5$ is a methylene or ethylene radical. This class includes alkyl and aryl esters of mercaptoacetic acid and mercaptopropionic acid in addition to the free acids;
3. a residue of a monocarboxylic acid

wherein $R^4$ is selected from the same group as $R^3$, e.g. a residue of acetic, propionic, stearic, lauric, benzoic, naphthoic or phenylacetic acid, one of the isomeric methylbenzoic acids, or the mixture of fatty acids present in tall oil (a by-product of the paper-making process from wood pulp);

4. a residue of a half ester of a saturated or ethylenically unsaturated dicarboxylic acid, e.g. maleic or adipic acid wherein the alcohol residue of the ester contains between 1 and 20 carbon atoms; representative half esters include isopropyl maleate, iso-octyl maleate, lauryl maleate, stearyl maleate, benzyl maleate, cyclohexyl maleate and lauryl adipate;
5. a residue of a diester of thiomalic acid,

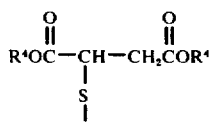

bonded to the sulfur atom;
6. a residue of maleic acid,

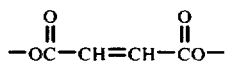

or other dicarboxylic acid.

The stabilizer compositions of this invention are suitable for use with plastisols containing vinyl chloride polymers. As used herein the term "vinyl chloride polymers" includes both homopolymers of vinyl chloride and copolymers wherein the major portion of the repeating units is derived from vinyl chloride, the remaining units being derived from one or more ethylenically unsaturated monomers which can be copolymerized with vinyl chloride. Suitable comonomers include vinylidene chloride, olefinic hydrocarbons such as ethylene and propylene, esters of unsaturated acids such as the lower alkyl esters of acrylic, methacrylic and maleic acids and vinyl esters of saturated acids such as vinyl acetate.

In addition to vinyl chloride polymer and stabilizers the present compositions also contain a plasticizer for the polymer in an amount of between 5 and 60% based on the weight of the composition. Vinyl chloride polymers of suitable inherent viscosity (between 0.5 and 1.60, measured as a 0.2% solution in cyclohexane at 30° C.) are inherently rigid, brittle materials. By combining the polymer with a suitable plasticizer it is possible to obtain a plastisol which is solid, semi-solid or liquid at ambient temperatures. Alternatively, an organic solvent can be added to the plasticized polymer to form an organosol. The resultant plastisol or organosol can readily be converted to shaped articles by casting or molding. Plasticized vinyl chloride polymers are employed as coating or encapsulating materials for a wide variety of metallic and non-metallic substrates. Coatings for fabrics is only one of the many uses for these materials. The plasticized polymers are applied to the fabric in liquid form by dipping, spread coating or spraying. Plasticized polymers in a finely divided solid form known as powder coatings can be applied by suspending the polymer particles in an air stream and dipping a heated substrate into the suspended particles. Some of the particles contact and are melted by the heated surface to form a coherent coating. Other known techniques for applying powder coatings, including electrostatic spraying, can also be employed. Regardless of the application method, the coated substrate is usually heated to melt the polymer particles and form a coherent film.

Among the classes of known plasticizers for vinyl chloride polymers are esters derived from aromatic or aliphatic dicarboxylic acids and monohydric alcohols, both of which contain between 6 and 20 carbon atoms. Representative plasticizers include dioctyl phthalate, dioctyl adipate and dioctyl sebacate. Other plasticizers include alkyl, aryl and mixed alkyl-aryl triesters of phosphoric acid such as triphenyl phosphate; esters of benzoic acid with oligomers of alkylene diols, such as dipropylene glycol dibenzoate, epoxidized esters of unsaturated acids such as butyl epoxy stearate, lower alkyl esters of trimellitic acid, chlorinated paraffinic hydrocarbons containing between 30 and 70% by weight of chlorine and liquid polyesters derived from aliphatic dicarboxylic acids and diols.

The stabilized compositions of this invention may optionally contain one or more materials selected from volatile organic solvents (including ketones, primary alcohols, and liquid hydrocarbons containing between 1 and 12 carbon atoms), pigments such as titanium dioxide, antioxidants such as hindered phenols, lubricating agents, which include paraffin waxes, fillers such as calcium carbonate or kaolin and viscosity control agents such as fused silica or polymeric glycols containing an average of between 2 and 5 repeating units per molecule. The antioxidant prevents or inhibits degradation of the vinyl chloride polymer or other component by oxidizing agents, such as the oxygen present in the air. Polyethylene glycols and polypropylene glycols are particularly preferred for use as viscosity control agents.

The heat stability imparted to plasticized vinyl chloride polymers by the present combinations of an organophosphite and an organotin compound is further enhanced when a heavy metal salt, particularly a zinc cadmium or barium salt of a monocarboxylic acid containing between 6 and 12 carbon atoms, is included in the polymer composition at a concentration of between 0.5 and 10%, based on the weight of the stabilizer component.

The following examples demonstrate preferred embodiments of the present stabilizer compositions, and should not be interpreted as limiting the scope of the invention as defined in the accompanying claims. In the examples all parts and percentages are by weight.

EXAMPLE 1

The stabilizers were evaluated using plasticized vinyl chloride polymer compositions containing the following ingredients:

| | |
|---|---|
| Vinyl chloride homopolymer | 100 parts |
| Dioctyl phthalate | 60 parts |
| Epoxidized soybean oil | 5 parts |
| Stabilizer | as specified |

The formulations were prepared by gradually adding all of the polymer to 45 parts of dioctyl phthalate with stirring. The remaining 15 parts of phthalate ester was then blended into the resultant thick paste, followed by the epoxidized soybean oil. Depending upon the number of samples needed, the desired amount of the resultant mixture was weighed out and combined with the required amount of stabilizer using high speed agitation. The composition was then dearated under reduced pressure and cast into a film using a draw-down blade. The thickness of the film thus produced was between 0.02 and 0.03 inch (0.05 and 0.08 cm.). The film was heated to a temperature of 190° C. for 5 minutes to fuse together the individual polymer particles. After cooling, the film was cut into square samples measuring 2.54 cm. along each side. The samples were placed in a circulating air oven heated to 205° C. for 25 minutes. Samples were withdrawn from the oven at 5 minute intervals and rated for color using the Gardner Color Sclae by visually comparing the color of the sample with a set of Gardner standard color disks which were numbered according to depth of shade from 1 (water-white) to 18 (dark brown). The color ratings for compositions containing combinations of diphenyl isodecyl phosphite and an organotin compound or the phosphite alone appear in Table 1. The ratings obtained for samples containing the organotin compound as the sole stabilizer are summarized in Table 2. The organotin compounds are represented by letters as follows:

A = di-n-butyltin-S,S'-bis(isooctyl mercaptoacetate); used alone at 2.0 parts

B = di-n-butyltin dilaurate; used alone at 2.0 parts and 0.25 part

C = triphenyltin lauryl mercaptide; used alone at 2.5 parts

D = monobutyltin tris(2-ethyl hexoate); used alone at 2.5, 1.0 and 0.25 parts

E = di-n-butyltin bis(isooctyl maleate); used alone at 0.25 part

F = di-n-butyltin-S,S'-bis(lauryl mercaptopropionate); used alone at 0.25 part

G = di-n-butyltin-S,S'-bis(diisooctyl thiomaleate); used alone at 0.25 part

H = butyltin tris tallate (derived from tall oil fatty acids); used alone at 2.5 parts

TABLE 1

| Phosphite (parts per 100 parts of polymer) | Organotin Compounds (parts per 100 parts of polymer) | Gardner color following x minutes of heating at 205° C. | | | | | |
|---|---|---|---|---|---|---|---|
| | | X= 0 | 5 | 10 | 15 | 20 | 25 |
| 2.0 | none | 0 | 1 | 4 | 7 | 11 | 13 |
| 2.5 | none | 0 | 1 | 2 | 5 | 7 | 12 |
| 1.75 | A (0.25) | 0 | 0 | 0 | 2 | 5 | 8 |
| 1.75 | B (0.25) | 0 | 0 | 2 | 5 | 7 | 9 |
| 2.25 | C (0.25) | 0 | 0 | 0 | 2 | 4 | 5 |
| 1.75 | D (0.25) | 0 | 0 | 2 | 3 | 4 | 5 |
| 2.0 | D (0.5) | 0 | 0 | 0 | 1 | 3 | 4 |
| 1.5 | D (1.0) | 0 | 0 | 1 | 1 | 3 | 5 |
| 2.25 | E (0.25) | 0 | 0 | 0 | 2 | 3 | 5 |
| 2.25 | F (0.25) | 0 | 0 | 0 | 1 | 2 | 4 |
| 2.25 | G (0.25) | 0 | 0 | 0 | 1 | 2 | 4 |
| 2.31 | H (0.19) | 0 | 0 | 0 | 1 | 2 | 3 |

TABLE 2

Stabilization Imparted by Organotin Compounds Without Phosphite

| Compound | Parts (per 100 parts of polymer) | Gardner color following x minutes of heating at 205° C. | | | | | |
|---|---|---|---|---|---|---|---|
| | | x= 0 | 5 | 10 | 15 | 20 | 25 |
| A | 2.0 | 0 | 0 | 1 | 3 | 13 | 15 |
| B | 2.0 | 0 | 0 | 4 | 12 | 14 | 17 |
| B | 0.25 | 0 | 1 | 2 | 12 | 16 | 17 |
| C | 2.5 | 0 | 1 | 2 | 2 | 6 | 13 |
| D | 2.5 | 0 | 0 | 1 | 4 | 15 | 15 |
| D | 1.0 | 0 | 1 | 2 | 6 | 13 | 13 |
| D | 0.25 | 0 | 1 | 2 | 6 | 13 | 14 |
| E | 0.25 | 0 | 1 | 3 | 12 | 16 | 17 |
| F | 0.25 | 0 | 1 | 1 | 7 | 15 | 16 |
| G | 0.25 | 0 | 1 | 1 | 9 | 14 | 16 |
| H | 2.5 | 0 | 1 | 2 | 5 | 12 | 13 |

EXAMPLE 2

This example demonstrates that the improved stabilization imparted by the present organotin compounds is obtained using a variety of phosphites. The samples employed to evaluate heat stability were prepared and tested as described in Example 1. Each of the phosphites were tested alone and in combination with 0.25 parts of monobutyltin-S,S',S''-tris(isooctyl mercaptoacetate) per 100 parts of polymer. The amount of each phosphite employed was equivalent to a phosphorus content of 0.2 part per 100 parts of vinyl chloride polymer.

The results of the evaluation are summarized in the following Table 3.

TABLE 3

Effect of Various Phosphites on Heat Stability Using Monobutyltin-S,S'S''-tris(isooctyl mercaptoacetate)

| Phosphite* | Parts(per 100 parts of polymer) | Gardner Color Following x Minutes of Heating at 205° C. | | | | | | |
|---|---|---|---|---|---|---|---|---|
| | | x= 0 | 5 | 10 | 15 | 20 | 25 | |
| Diphenyl isodecyl phosphite | 2.25 | 0 | 0 | 0 | 0 | 1 | 3 | (with organotin compound) |
| | 2.25 | 0 | 1 | 3 | 6 | 9 | 13 | (without organotin compd) |
| Phenyl diisodecyl phosphite | 2.6 | 0 | 0 | 0 | 0 | 1 | 3 | (with organotin compound) |
| | 2.6 | 0 | 1 | 2 | 3 | 8 | 11 | (without organotin compd) |
| Triisodecyl phosphite | 3.0 | 0 | 0 | 0 | 0 | 1 | 4 | (with organotin compound) |
| | 3.0 | 0 | 1 | 1 | 3 | 13 | 16 | (without organotin compd) |
| Triphenyl phosphite | 1.85 | 0 | 0 | 0 | 0 | 3 | 5 | (with organotin compound) |
| | 1.85 | 0 | 1 | 2 | 6 | 14 | 16 | (without organotin compd) |

*Concentration of phosphite equivalent to 0.2 part of phosphorus.

EXAMPLE 3

The evaluation described in Example 2 was repeated using 0.25 part of dibutyltin bis(isooctyl maleate) as the organotin compound. The results of the evaluation are summarized in Table 4.

TABLE 4

Effect of Various Phosphites on Heat Stability Using Dibutyltin bis(isooctyl maleate).

| Phosphite | Parts per 100 parts of polymer | Gardner Color Following x Minutes of Heating at 205° C. | | | | | |
|---|---|---|---|---|---|---|---|
| | | X= 0 | 5 | 10 | 15 | 20 | 25 |
| Triphenyl phosphite | 1.85 | 0 | 1 | 4 | 8 | 12 | 14 |
| Triisodecyl phosphite | 3.00 | 0 | 1 | 2 | 5 | 11 | 15 |
| Phenyl diisodecyl phosphite | 2.60 | 0 | 1 | 2 | 5 | 7 | 12 |
| Diphosphite* | 4.20 | 0 | 1 | 3 | 6 | 11 | 14 |
| None (organotin compound alone at 0.25 part) | | 0 | 1 | 3 | 12 | 16 | 17 |

*Diphosphite=Tetrakis (nonylphenyl) polypropylene glycol 425 diphosphite (contains 4.5% phosphorus).

The data in the foregoing examples demonstrate the improved resistance to initial discoloration imparted by the organotin compound.

EXAMPLE 4

This example demonstrates that no improvement or a decrease rather than an increase in heat stability is obtained when the weight ratio of phosphite to organotin compound is less than 1:1.

The samples were prepared and tested as described in Example 1. The organotin compounds employed were dibutyltin-S,S'-bis(isooctyl mercaptoacetate) (A) and dibutyltin di(isooctyl maleate) (B). The phosphite was diphenyl isodecyl phosphite. The concentrations of the two stabilizer components together with the Gardner color values observed during the test are summarized in the following Table 5, wherein all parts are by weight based on 100 parts of vinyl chloride polymer.

TABLE 5

Heat Stability for Compositions Wherein Phosphite Organotin is less than 1:1

| Organotin Compound (parts) | Parts of Phosphite | Gardner Color Value Following x minutes of heating at 205° C. | | | | |
|---|---|---|---|---|---|---|
| | | X= 0 | 5 | 10 | 15 | 20 |
| A (2.25) | 0.25 | 0 | 0 | 0 | 1 | 2 |
| A (1.5) | 1.0 | 0 | 0 | 0 | 1 | 2 |
| A (2.5) | 0 | 0 | 0 | 0 | 1 | 1 |
| B (2.25) | 0.25 | 0 | 1 | 1 | 2 | 12 |

EXAMPLE 5

This example demonstrates that the heat stability imparted to vinyl chloride polymers by the present stabilizer compositions is not observed when the polymers are subjected to high levels of shear such as are encountered during extrusion or injection molding.

The mixing bowl of a Brabender Plasticorder was charged with a 55 gram sample exhibiting the following composition:

| | |
|---|---|
| Vinyl chloride homopolymer | 100 parts |
| Dioctyl phthalate (plasticizer) | 45 parts |
| Epoxidized soybean oil | 5 parts |
| Stabilizer (as specified) | 1 part |

The contents of the mixing bowl were heated to 190° C. and the speed of the rotors adjusted to 200 revolutions per minute. The amount of torque required to maintain a constant motor speed of 200 revolutions per minute was recorded as a function of time. As the polymer melted the torque decreased to a value which remained fairly constant until the polymer began to decompose and undergo crosslinking, at which time the slope of the recorder plot abruptly increased. The time which had elapsed when the slope of the curve increased due to polymer decomposition is recorded as the time to failure in the following table.

The phosphite and organotin compound employed were diphenyl isodecyl phosphite and dibutyltin-S,S'-bis (isooctyl mercaptoacetate) respectively.

| Parts* of Phosphite | Parts* of Organotin Compound | Time to Failure (minutes) |
|---|---|---|
| 0 | 1 | 46 |
| 1 | 0 | 36 |
| 0.25 | 0.75 | 38 |
| 0.75 | 0.25 | 26 |
| 0.9 | 0.1 | 30 |

*Parts per 100 parts by weight of polymer.

The results of this test demonstrate that the stability imparted by the phosphite is adversely affected by the addition of an organotin compound in an amount within the scope of the present invention.

What is claimed is:

1. A method for improving the heat stability exhibited by shaped articles prepared using plasticized vinyl chloride polymer compositions consisting essentially of
    a. a vinyl chloride homopolymer or a copolymer wherein at least 50% of the repeating units are derived from vinyl chloride, the remaining repeating units being derived from one or more ethylenically unsaturated compounds which are copolymerizable with vinyl chloride;
    b. between 5 and 60%, based on the weight of said composition of a plasticizer for vinyl chloride polymers;

c. between 0.5 and 5%, based on the weight of said composition, of an organic ester of phosphorous acid, said ester exhibiting the general formula $P(OR^1)_3$ or $P(OR^1)_2(OR^2)$ wherein $R^1$ and $R^2$ are each selected from the group consisting of alkyl radicals containing between 1 and 20 carbon atoms, cycloalkyl, aralkyl, aryl, alkaryl radicals and hydrogen atoms with the proviso that the number of hydrogen atoms is 0 or 1, the method comprising (1) adding to said polymer composition between 0.1 and 1%, based on the weight of said composition, of an organotin compound corresponding to the general formula $R_m{}^3SnY_{4-m}$,

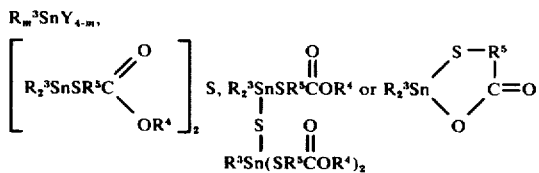

wherein $m$ represents the integer 1, 2 or 3 and Y represents a radical exhibiting a formula selected from the group consisting of $-SR^4$,

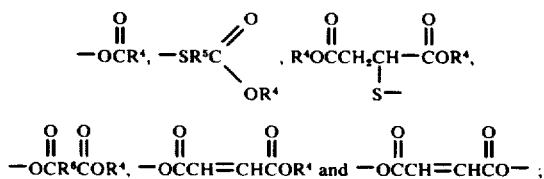

$R^3$ and $R^4$ are each individually selected from the group consisting of alkyl radicals containing between 1 and 20 carbon atoms, cycloalkyl, aralkyl, aryl and alkaryl radicals and $R^5$ is a methylene or ethylene radical and $R^6$ is an alkylene radical containing between 1 and 8 carbon atoms, inclusive, with the proviso that the organotin compound constitutes between 3 and 45% of the combined weight of the organotin compound and the organic ester of phosphorous acid, and (2) subsequently converting said composition into a product selected from the group consisting of shaped articles, films and coatings, wherein the conversion is accomplished in the absence of significant amounts of shear.

2. The method of claim 1 wherein the phosphite is selected from the group consisting of triphenyl phosphite, diphenyl isodecyl phosphite, triisodecyl phosphite, phenyl diisodecyl phosphite and tetrakis(nonylphenyl) polypropylene glycol 425 diphosphite.

3. The method of claim 1 wherein the vinyl chloride polymer is a homopolymer.

4. The method of claim 1 wherein the combined concentration of ester and organotin compound is between 1.5 and 2.5%.

5. The method of claim 1 wherein the organotin compound is selected from the group consisting of butyltin-S,S',S''-tris(isooctyl mercaptoacetate), dibutyltin-S,S'-bis(isooctyl mercaptoacetate), dibutyltin dilaurate, dibutyltin bis(2-ethyl hexoate), dibutyltin bis(isooctyl maleate), dibutyltin-S,S'-bis(isooctyl mercaptopropionate), dibutyltin-S,S'-bis(thiomaleate) and triphenyltin S-lauryl mercaptide.

6. The method of claim 1 wherein the plasticizer is an alkyl, aryl or a mixed alkyl-aryl triester of phosphoric acid.

* * * * *